(12) United States Patent
Niklaus et al.

(10) Patent No.: US 11,898,284 B2
(45) Date of Patent: Feb. 13, 2024

(54) DRYING DEVICE AND DRYING METHOD FOR A TEXTILE MATERIAL WEB

(71) Applicant: AUTEFA SOLUTIONS GERMANY GMBH, Friedberg (DE)

(72) Inventors: Michael Niklaus, Seuzach (CH); Christian Richter, Augsburg (DE)

(73) Assignee: AUTEFA SOLUTIONS GERMANY GMBH, Friedberg (DE)

(*) Notice: Subject to any disclaimer, the term of this patent is extended or adjusted under 35 U.S.C. 154(b) by 263 days.

(21) Appl. No.: 17/427,049

(22) PCT Filed: Feb. 6, 2020

(86) PCT No.: PCT/EP2020/052982
§ 371 (c)(1),
(2) Date: Jul. 29, 2021

(87) PCT Pub. No.: WO2020/161234
PCT Pub. Date: Aug. 13, 2020

(65) Prior Publication Data
US 2022/0106718 A1    Apr. 7, 2022

(30) Foreign Application Priority Data
Feb. 8, 2019  (DE) ..................... 20 2019 100 745.1

(51) Int. Cl.
*D04H 1/492* (2012.01)
*D04H 3/11* (2012.01)
(Continued)

(52) U.S. Cl.
CPC ............... *D04H 1/492* (2013.01); *D04H 3/11* (2013.01); *D04H 18/04* (2013.01); *D06B 15/04* (2013.01); *F26B 13/12* (2013.01); *F26B 25/06* (2013.01)

(58) Field of Classification Search
CPC .......... D04H 18/04; D04H 1/492; D04H 3/11; D04H 1/465; D04H 18/00; F26B 13/12;
(Continued)

(56) References Cited

U.S. PATENT DOCUMENTS 3,303,576 A * 2/1967 Sisson ...................... D21F 5/00
                                                        34/115
3,447,247 A * 6/1969 Daane ...................... D21F 5/00
                                                        34/634
(Continued)

FOREIGN PATENT DOCUMENTS

CN          1517482 A      8/2004
CN        103090648 A      5/2013
(Continued)

*Primary Examiner* — Amy Vanatta
(74) *Attorney, Agent, or Firm* — McGlew and Tuttle, P.C.

(57) ABSTRACT

A drying method and to a drying device (2) for a moist material web (4) which is composed of a textile fibrous material and which has for example been compacted using liquid jets (45). The drying device (2) includes a drying chamber (22) with an aeration (ventilating) device (29) and an inlet (18), an outlet (19) and a fluid-permeable conveying device (23) for the running material web (4). The material web (4) is transported within the drying chamber (22) by the conveying device (23) and is dried using a heated gas, in particular air. The drying device (2) additionally has a suction device (5) which locally suctions and discharges liquid, in particular water, which is contained in the material web (4) by a suction flow (6) at one or more suction locations (53) at the material web (4).

20 Claims, 13 Drawing Sheets

(51) Int. Cl.
*D04H 18/04* (2012.01)
*D06B 15/04* (2006.01)
*F26B 13/12* (2006.01)
*F26B 25/06* (2006.01)

(58) Field of Classification Search
CPC .......... F26B 25/06; F26B 5/12; F26B 13/105;
F26B 13/16; F26B 13/08; F26B 21/002;
F26B 21/004; F26B 21/04; F26B 21/08;
F26B 13/10; F26B 13/103; F26B 21/02;
F26B 21/022; D06B 15/04; D06C
2700/09
See application file for complete search history.

(56) References Cited

U.S. PATENT DOCUMENTS

| | | | |
|---|---|---|---|
| 3,879,858 A | | 4/1975 | Candor et al. |
| 4,026,035 A | * | 5/1977 | Dyer ................. F25B 29/00 34/454 |
| 2002/0046449 A1 | * | 4/2002 | Fleissner ............. D06C 9/02 28/106 |
| 2005/0015950 A1 | * | 1/2005 | Fleissner ............. D04H 1/54 28/163 |
| 2009/0209156 A1 | * | 8/2009 | Pedoja ................ D04H 1/495 264/293 |
| 2015/0198368 A1 | * | 7/2015 | Schmit ............... F26B 23/002 34/88 |
| 2018/0080712 A1 | * | 3/2018 | Ayrault .............. D06B 15/043 |
| 2018/0291540 A1 | * | 10/2018 | Gualtieri ............. D06C 7/00 |
| 2020/0033059 A1 | * | 1/2020 | Böhn ................. F26B 21/10 |

FOREIGN PATENT DOCUMENTS

| | | | | |
|---|---|---|---|---|
| CN | 103459957 A | | 12/2013 | |
| CN | 108351167 A | | 7/2018 | |
| DE | 69017218 T2 | | 6/1995 | |
| DE | 19519551 A1 | | 11/1996 | |
| DE | 19620503 A1 | | 11/1997 | |
| DE | 102010046592 A1 | | 4/2011 | |
| DE | 202015106039 U1 | | 2/2017 | |
| DE | 102017103422 A1 | * | 8/2018 | ............ D21F 5/004 |
| DE | 102017104497 A1 | | 9/2018 | |
| EP | 0088353 A1 | | 9/1983 | |
| EP | 0853156 A2 | | 7/1998 | |
| FR | 3061916 A1 | | 7/2018 | |
| GB | 2301425 A | * | 12/1996 | ............ D06B 15/04 |
| WO | 2016146662 A1 | | 9/2016 | |
| WO | WO-2018134526 A1 | * | 7/2018 | ............ B01D 1/00 |
| WO | WO-2018177648 A1 | * | 10/2018 | ............ F26B 13/06 |

* cited by examiner

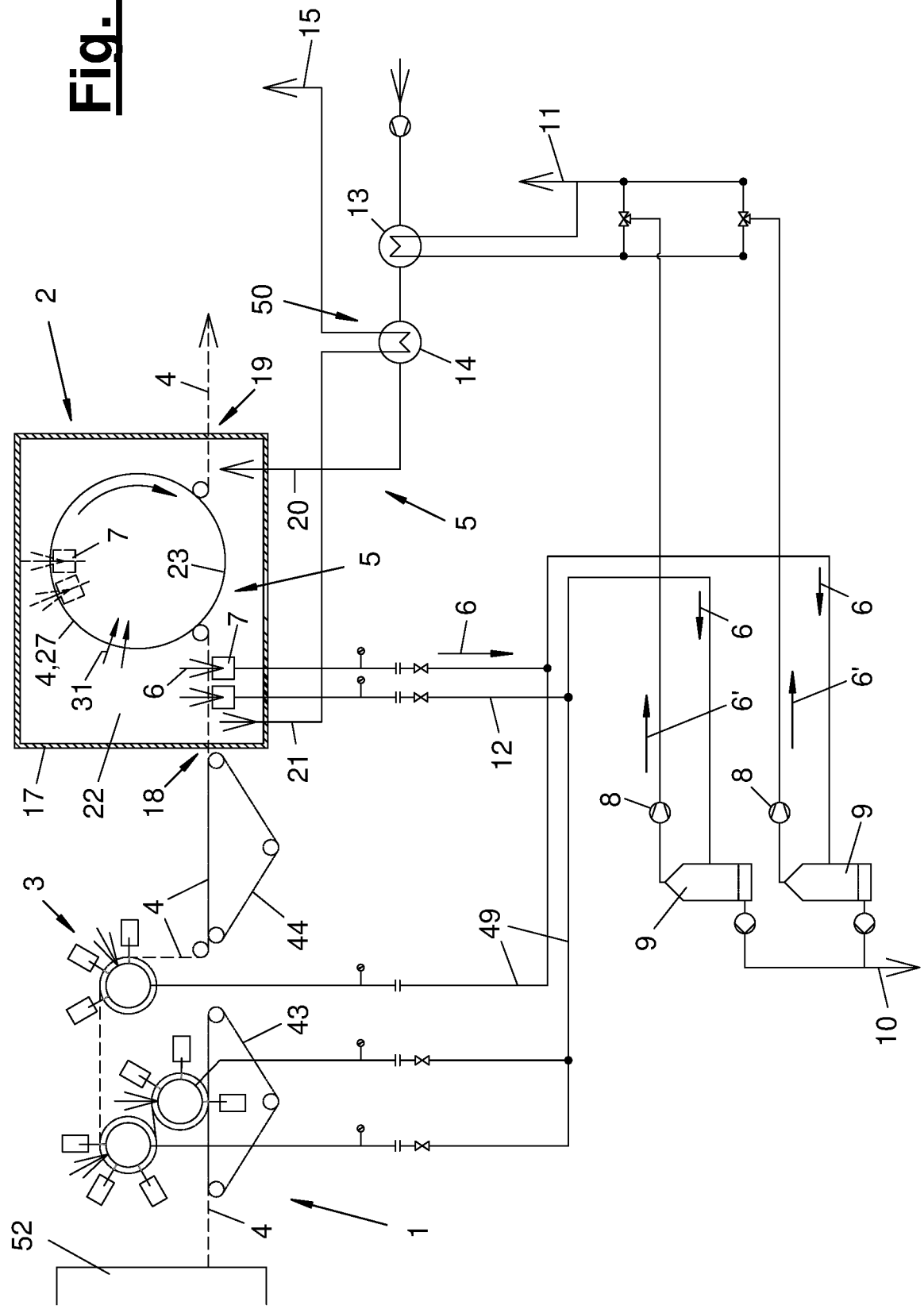

DRYING DEVICE AND DRYING METHOD FOR A TEXTILE MATERIAL WEB

CROSS REFERENCE TO RELATED APPLICATIONS

This application is a United States National Phase Application of International Application PCT/EP2020/052982, filed Feb. 6, 2020, and claims the benefit of priority under 35 U.S.C. § 119 of German Application 20 2019 100 745.1, filed Feb. 8, 2019, the entire contents of which are incorporated herein by reference.

TECHNICAL FIELD

The present invention pertains to a drying device and to a drying process having for a wet material web, hydroentangled especially with liquid jets, which material web is formed of a textile fiber material, especially of a fibrous nonwoven.

TECHNICAL BACKGROUND

Such a drying device for a hydroentangled material web consisting of a fibrous nonwoven is known from practice. The material web is transported in a drying chamber with a rotating drum and dried by a ventilating (aeration) device with heated air. The drying chamber is configured here as an oven chamber.

Further, it is known from practice that an additional device, in which the material web leaving the oven is subsequently exposed to hot steam jets emitted under high pressure and dried completely, is arranged downstream of such an oven.

SUMMARY

An object of the present invention is to show an improved drying technology, especially with improvement in terms of the construction effort as well as the energy balance and the amount of resources used.

The drying technology being claimed, i.e., the drying device and the drying process, have various advantages.

The suction device is arranged in addition to the ventilating (aeration) device of the drying device and it suctions liquid, especially water, which is contained in the material web, with a suction flow. The liquid particles are separated from the material web mechanically and entrained by the vacuum or suction pressure and by the kinetic energy of the suction flow. This mechanical drying takes place in addition to the thermal drying of the ventilating device. The liquid is suctioned off locally with the suction flow at one or more admission points or suction points at the material web. The liquid suctioned off is subsequently removed in the suction flow.

The material web is formed from a textile fiber material. The fibers may be synthetic or natural fibers or a fiber blend. The material web may be formed by textile fibers joined together in a random orientation. The material web may be, e.g., a fibrous nonwoven. The material web fed into the drying device may have been strengthened before, e.g., by liquid jets, especially by water jets or other fluid jets. These also include gas jets. The material web is configured, e.g., as a flat web. It may be a single layer or multilayer web. It may have a certain lability, especially susceptibility to pulling. A conveying device and its supporting function may be advantageous for the secure and low-stress transportation of the material web.

During the suctioning of the liquid, the material web is in contact with the fluid-permeable conveying device, by which it is also being transported through the drying chamber. This is advantageous for various reasons. On the one hand, space and construction effort are saved. On the other hand, it is not necessary to transfer the mechanically dehumidified material web to another conveying device. The thermal drying may take place in the area around the mechanical drying, especially immediately following the mechanical drying. The mechanical drying and the thermal drying of the material web may take place advantageously at the same conveying device.

In addition, it is possible to carry out the mechanical drying within and/or outside of the heated drying chamber with a correspondingly temperature-controlled gas. The mechanical drying may also take place at a plurality of locations or suction points, optionally at locations or suction points optionally distributed and located at spaced locations from one another along the path of movement. The thermal drying and the mechanical drying may take place, furthermore, such that they alternate several times, e.g., periodically.

An additional and efficient dehumidification, especially dehydration, of the material web takes place due to the suctioning. For example, about 30% of the liquid content in the material web can be removed by the suctioning. The material web can be dried on the whole more rapidly and better. The amount of energy used for the thermal drying of the material web can be reduced.

The suction flow loaded with the suctioned-off liquid can be regenerated. Heat and liquid, especially water, can be recovered and utilized. The drying technology being claimed can have as a result an especially good energy and resource balance.

The local suctioning at a suction point may take place by a suction element arranged at the conveying device, especially a hollow suction nozzle bar. The suction element, especially the hollow suction nozzle bar, may have a narrowed, e.g., slot-like nozzle opening, which is directed towards the material web, with which an intense suction flow can be generated locally at the material web.

Moreover, the suction device may have a vacuum generator connected to the suction element, e.g., an air pump, for generating the suction flow, and a separator, e.g., a centrifugal separator or cyclone, which is connected to the suction element, for separating the liquid from the suction flow. The kinetic energy of the suction flow can advantageously be used for the separation, especially in a rotating flow or in a swirling flow in a centrifugal or cyclone separator.

The suction device may further have a heat exchanger, e.g., for the suction flow and/or for the dehumidified gas stream released by the vacuum generator, and optionally additional components. For example, a fresh gas, which is then fed to the drying device and to the ventilating device thereof, may be preheated with the heat exchanger.

The vacuum generator, the separator and the heat exchanger may be present as single units or as a plurality of units each. They may be arranged outside the drying chamber. They may have multiple uses and may also be used for other purposes, e.g., for a liquid jet entanglement device.

Arrangement of the vacuum generator behind the separator in the flow direction is advantageous from the viewpoint of energy. The waste heat generated at the vacuum generator may be introduced into the suction flow and be used regeneratively, e.g., via a heat exchanger. For example, fresh gas, which is then fed to the drying device and to the ventilating device thereof, may be preheated with this.

The suction device may have a return for the dehumidified gas stream released by the vacuum generator into the drying chamber. As a result, it is possible, e.g., to use a drying gas circulated and used regeneratively. The returned and dehumidified gas stream may additionally be heated with the waste heat of the vacuum generator, so that heat losses in said circuit are avoided or minimized and a warm gas can be returned to the drying chamber.

Further, the liquid, especially water, which was separated from the suction flow, can be reused. The heat contained in the liquid can be used via a heat exchanger, e.g., to heat said fresh gas. On the other hand, the liquid may be fed to another consumer, e.g., to the liquid jet hydroentanglement device. A closed circuit is also possible hereby for the liquid contained and suctioned off in the material web.

It is favorable for technological reasons to arrange the one or more suction points, especially the suction elements thereof, in the area of an inlet of the drying device. One or more suction elements may be arranged within the drying chamber and/or outside of the drying chamber at an external area of the conveying device.

A suction element may likewise be located in the immediate vicinity of the inlet of the drying device in case of external arrangement. It is especially arranged directly upstream of the inlet.

A suction element may also be arranged in the inlet. It may be used now to seal the inlet against infiltrated air from the outside.

The conveying device for the material web, which preferably circulates in a closed ring loop, may be led out of the drying chamber in some areas for this purpose.

Positioning following the inlet is likewise favorable in case of an arrangement of the one or more suction elements within the drying chamber. The heated drying gas present may be used within the drying chamber for suctioning and dewatering.

In the area of the inlet, this heated drying gas in the drying chamber may have a relatively low temperature at a relatively high humidity. This is advantageous, on the one hand, for the aforementioned low-loss return and for the energy balance. On the other hand, the humid gas suctioned may condense during the flow through the conveying device and the material web. The condensate formed may be suctioned off by the suction device and removed. The suctioning can also optimize the thermal drying technology as a result.

The conveying device is fluid-permeable. It carries along the material web due to its movement. The conveying device may be configured, e.g., as a flexurally elastic conveyor belt, as a rotating conveying drum or the like.

The ventilating device can generate a circulating flow of the heated gas within the drying chamber. The circulating flow may be directed transversely through the material web and the conveying device. The conveying device now supports the material web against the streaming pressure.

The suction device suctions gas at the respective suction point from that environment. The gas is suctioned from the rear side of the material web through the material web and through the supporting conveying device. Depending on the arrangement of the suction element or suction elements within or outside of the drying chamber, said gas is the drying gas from the drying chamber or ambient air.

The suction device may make do with the one or more suctioning elements. A separate blowing device, which generates an additional, intense local blowing flow, is not necessary.

In case of an arrangement of the suction point and of the suction element within the drying chamber, the suction flow and the circulating flow are present next to one another and are directed in the same direction. The suction flow has a higher flow velocity than the circulating flow. The vacuum in the suction flow may also be substantially higher than the vacuum in the circulating flow. The pressure difference may be, e.g., 450 mbar in the suction flow compared to 100 mbar in the circulating flow.

The drying chamber, the ventilating device and the conveying device for the moving material web may have different configurations.

A drying gas atmosphere is formed in the preferably thermally insulated drying chamber. This may be controlled, preferably regulated concerning its temperature and its moisture content.

The drying chamber may be divided into a plurality of chamber areas, which are optionally divided by partitions into chamber areas separated from one another. The material web and at least one partial area of the conveying device pass through the drying chamber and are subjected there to the heated and preferably temperature- and moisture-controlled circulating flow. Separate circulating flows may be generated in the chamber areas. These may be controlled and preferably regulated in terms of their temperature and the moisture content. The individual, e.g., horizontal partitions or all partitions may be absent. The formation and the division of the chamber areas may be carried out by means of the plurality of circulating flows, which are separated from one another.

Arrangement of one or more suction elements in one or more, optionally partitioned chamber areas is especially advantageous. The gas atmosphere present there may optionally be used. Arrangement at the chamber area adjacent to the inlet is especially favorable.

An exchange flow or counterflow of the drying gas along the material web, which is preferably guided in a loop, may be present within the drying chamber. The counterflow may be directed against the direction in which the material web is moving. The counterflow may be directed from a gas feed unit for fresh gas, especially fresh air, which gas feed unit is preferably arranged at the outlet, to a gas discharge arranged at the outlet. A gas and moisture exchange can take place with the counterflow. The gas temperature is lower and the moisture content is higher at the inlet than at the outlet.

Devices for sealing against the passage of infiltrated air and against the escape of drying gas to the outside may be located at the inlet and/or at the outlet.

The drying technology, especially the drying device, may have the following configurations, which may be used individually or in combination.

The drying device may have a gas atmosphere controlled or regulated in terms of temperature and moisture in the drying chamber.

The drying chamber may have a plurality of, especially two, chamber areas with an upright orientation or arrangement, which are arranged next to one another. The chamber areas may be arranged especially in a preferably regular matrix. The chamber areas may be arranged in a plurality of rows next to one another and in a plurality of columns one on top of another. The chamber areas in the matrix are preferably arranged in two upright columns and two or more horizontal rows.

The drying chamber may have a central, connecting chamber area with horizontal orientation on the top side.

An upright, optionally essentially gas-tight partition may be arranged between upright chamber areas or between the columns of a chamber matrix. Gas-permeable partitions (41) may be arranged in a horizontal position between the rows of the chamber matrix.

The vacuum zones of the circulating flows may be arranged in the chamber areas each within the path of movement of the material web or of the conveying device, which path of movement is, for example, loop-shaped.

One or more suctioning elements may be arranged outside of the drying chamber at an external area of said conveying device. The material web is transported with the conveying device for the thermal drying within the drying chamber.

One or more suction elements may be arranged within the drying chamber.

One or more suction elements may be arranged partially within and partially outside of the drying chamber, especially in the inlet.

The mentioned possibilities of arrangement for one or more suction elements may be present individually or in any combination. It also applies correspondingly to the one or more suction points.

The present invention is schematically described in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 13 is a schematic view showing a variant of the fiber treatment plant according to FIG. 1 with another drying device and suction device.

DESCRIPTION OF PREFERRED EMBODIMENTS

Figure 1:
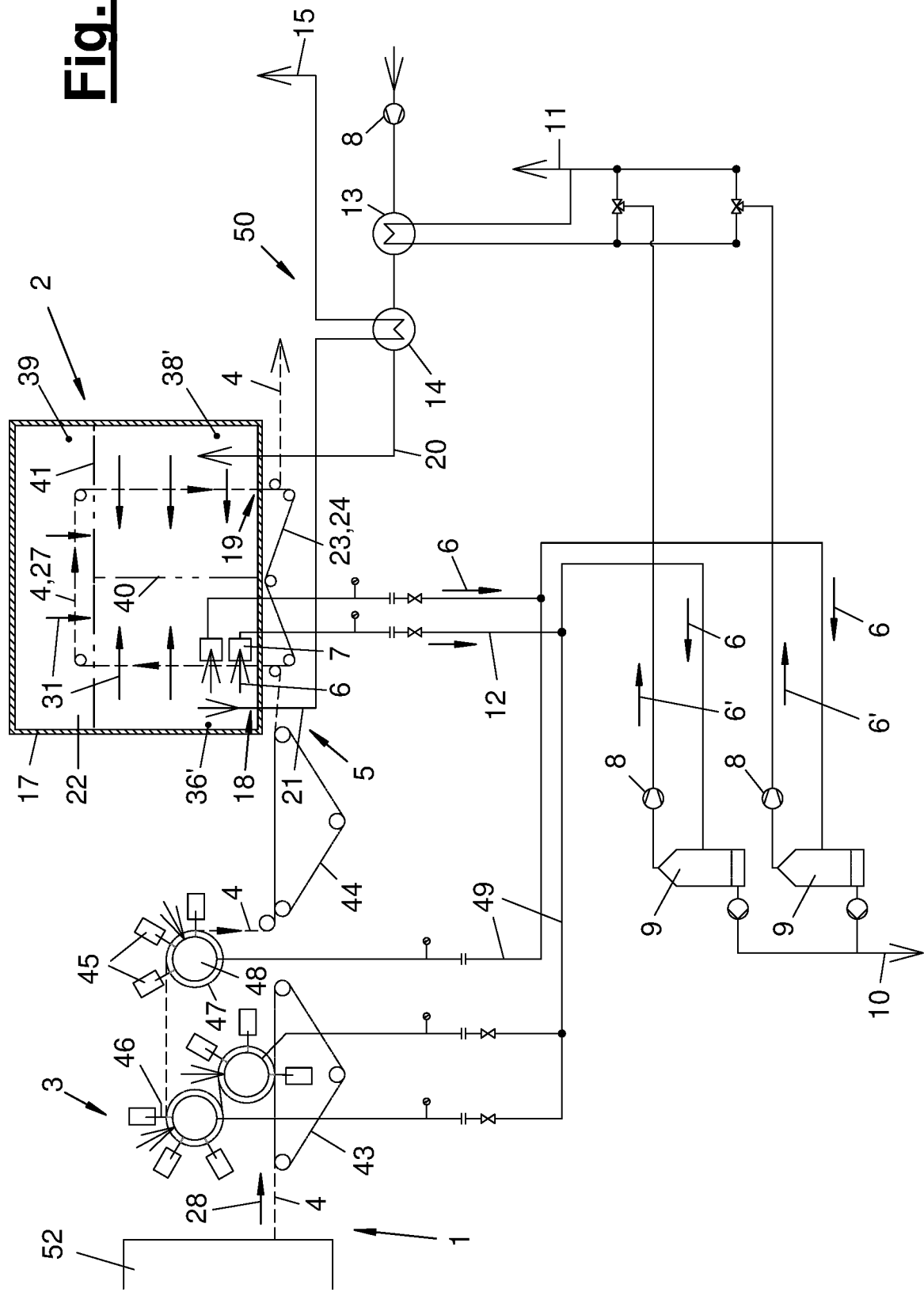
FIG. 1 is a schematic view showing a fiber treatment plant with a drying device and with a corresponding suction device.

Referring to the drawings, the present invention pertains to a drying device (2) with a suction device (5) as well as to a drying process and to a suction process. The present invention pertains, furthermore, to a fiber treatment plant (1) as well as to a corresponding process, which has such a drying device (2) with a suction device (5).

FIGS. 1 through 8 and FIG. 13 show in a schematic view such a fiber treatment plant (1). It has a drying device (2) with a suction device (5). The fiber treatment plant (1) may contain additional components, e.g., a liquid jet entanglement device (3), especially a water jet hydroentanglement device, as well as a pile-forming device (52), e.g., a card, an air-lay or the like, and optionally additional components. These may be, e.g., a nonwoven-layering apparatus and/or a further processing device, especially a cutting device and/or winding device. They are not shown for the sake of clarity.

The drying device (2) is used to dry a moist or wet material web (4) moving in the direction of the arrow or in the direction of movement. This was, for example, needled or strengthened and moistened before with liquid jets (46) in the liquid jet hydroentanglement device (3). The liquid jets (46) are, e.g., water jets. As an alternative, they may consist of another liquid. The liquid hydroentanglement device (3) described in more detail below is arranged upstream of the drying device (2) in the direction of movement of the material web (4). The moisture or dampness may also be introduced in another manner into the material web (4) to be dried.

The material web (4) consists of a textile fiber material. This may be, e.g., a fibrous nonwoven. The preferably short-staple fibers may be synthetic fibers or natural fibers or a fiber blend. The material web (4) may have a single-layer or multilayer configuration.

The pile-forming device (52) arranged upstream of the material web (4) in the direction of movement (28) may produce, e.g., an individual fibrous web or a plurality of fibrous webs, which form the material web (4) directly. As an alternative, they may be laid in a nonwoven layering apparatus arranged downstream of the pile-forming device (52), especially in a cross-lapper, into a multilayer nonwoven, which will then form the material web (4).

The drying device (2) has a drying chamber (22) with a ventilating device (29) and with an inlet (18) as well as with an outlet (19) for the material web (4). Further, the drying device (2) contains a fluid-permeable, e.g., perforated or grid-like conveying device (23) for the moving material web (4). The conveying device (23) may enter the drying chamber (22) together with the material web (4) through the inlet (18) and leave again through the outlet (19).

The material web (4) is transported within the drying chamber (22) with the conveying device (23) and is dried with a heated gas. The gas or drying gas is advantageously air, but it may also be formed, as an alternative, by another process gas. The drying chamber (22) is arranged, e.g., in a heat-insulated housing (17). The inlet (18) and the outlet (19) may be sealed against undesired passage of gas or air.

The drying device (2) additionally has a suction device (5), which suctions locally and removes liquid contained in the material web (4), e.g., water, with a suction flow (6) at one or more suction points (53) in the material web (4). The drying device (2) may have different structural and functional configurations. FIGS. 1 and 2, 3, 9 through 12 and 13 show different embodiments.

The suction device (5) has at least one suction element (7) arranged at the conveying device (23). The suction device (5) suctions gas at the respective admission point (53) or suction point out of the area around that point from the rear side of the material web (4) and suctions it through the material web (4) and through the conveying device (23). The fluid-permeable conveying device (23) can support the material web (4) against the pressing pressure of the suction flow (6).

Figure 2:
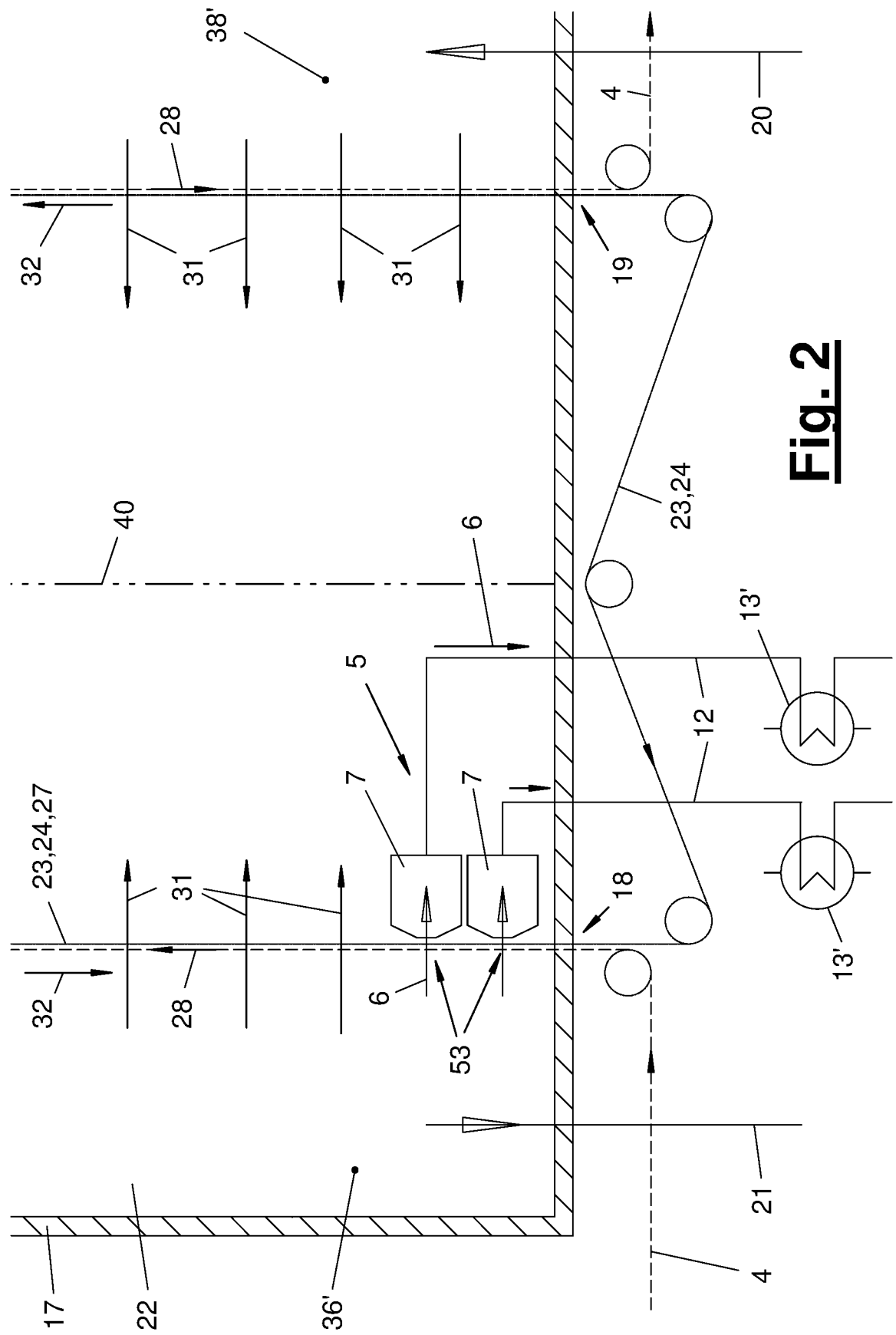
FIG. 2 is a cut-away and enlarged detail view of the suction device at a suction point according to FIG. 1.
Figure 3:
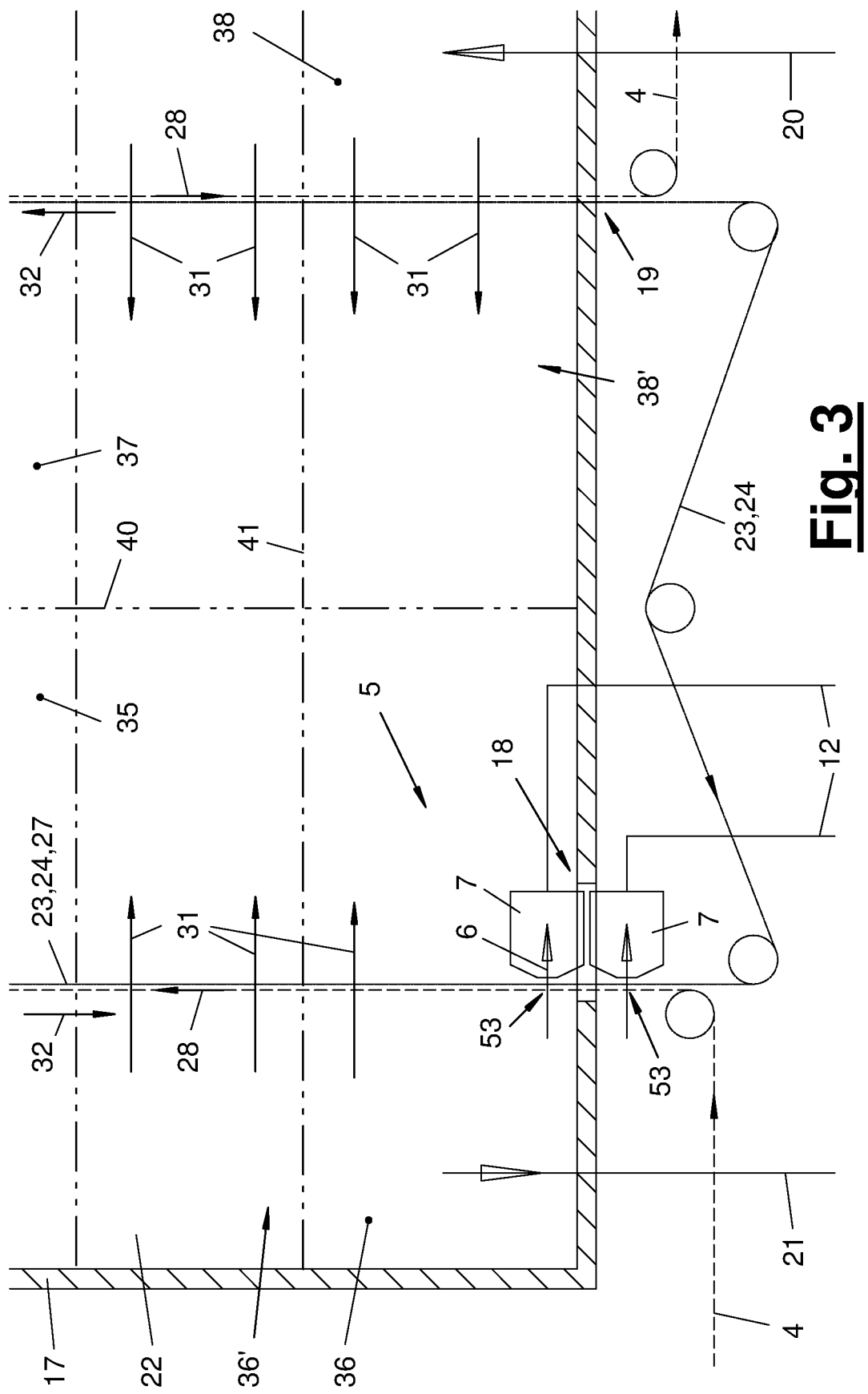
FIG. 3 is a cut-away and enlarged detail view showing a variant of the drying device and of the suction device at a suction point according to FIG. 2.

The suction element (7) may be configured, e.g., as a hollow suction nozzle bar. This nozzle bar may have a narrowed and, e.g., slot-like nozzle opening on the side facing the material web (4). The suction element (7), especially its nozzle opening, is located in the immediate vicinity of the conveying device (23) and at the material web (4) as well as at the suction point (53) located there. A strong suction flow (6) acting on the material web (4) at the suction point (53) can be generated by the high vacuum generated in the hollow suction element (7), especially in the suction nozzle bar, and by the gas suctioned in through the material web (4). FIGS. 2 and 3 illustrate this arrangement.

The vacuum present at the suction element (7), especially at the nozzle opening, also acts on the liquid particles at the suction point (53) in the material web (4) and suctions them. The suction flow (6) likewise separates liquid particles from the material web (4) at the suction point (53) and entrains them.

The suction device (5) may further have a vacuum generator (8) connected to the suction element (7) for generating the vacuum and the suction flow (6). The vacuum generator (8) may be configured, e.g., as a gas pump or in another suitable manner. The vacuum generator (8), especially the gas pump, can generate a high vacuum of, e.g., −0.2 bar to −0.5 bar on its suction side. The pressure may be substantially lower and equal, e.g., about 0.01 bar on the release side or blow-out side.

Further, the suction device (5) may have a separator (9) connected to the suction element (7) for separating the liquid from the moist suction flow (6). The separator (9) may be configured, e.g., as a centrifugal separator, especially as a cyclone, or it may be configured in another manner. The separator (9) has an inlet for the humid suction flow (6) and separate outlets for the separated liquid and for the dehumidified suction flow (6) or gas stream.

The vacuum generator (8) may be arranged behind the separator (9) in the flow direction of the suction flow (6). It may be located at the outlet area for the dehumidified suction flow (6) and may be connected to the outlet of the separator (9). The vacuum generator (8) suctions through the separator (9) on its vacuum side or suction side and generates the suction flow (6). It releases the dehumidified gas again in a gas stream (6') on its blow-out side. The gas stream (6') may be heated with the waste heat of the vacuum generator (8).

As an alternative, the vacuum generator (8) may be arranged in one variant, not shown, in front of the separator (9) in the flow direction of the suction flow (6). Both may be adapted for this in terms of construction correspondingly. The additional configurations of the suction device (5), which will be described below, also apply to this variant with a corresponding adaptation.

The suction device (5) may have, in addition, a heat exchanger (13, 13'). This may be intended and arranged for the suction flow (6) and/or for the dehumidified gas stream (6'), which is optionally heated with the waste heat of the vacuum generator (8). A heat exchanger, not shown, may also be used for the separated liquid. The heat exchanger (13, 13') may be present as an alternative or as a combination.

A heat exchanger (13) for the dehumidified and gas stream (6'), which is optionally heated with the waste heat of the vacuum generator, is shown in FIGS. 1, 4, 7 and 13 and will be described below.

FIG. 2 shows as an example a heat exchanger (13') for a suction flow (6) in a line (12). The consumer for the heat removed from the suction flow (6) is not shown. This consumer may be, e.g., a gas feed unit (20), not shown in FIG. 1, for fresh gas or fresh air of the drying chamber (22). As an alternative or in addition, the removed heat may be used in another manner in the fiber treatment plant (1), for example, in the liquid jet hydroentanglement device (3) or at another location.

The above-mentioned components (8, 9, 13, 13') of the suction device (5) may be present as single components or as a plurality of components. They may be used for regenerating the suction flow (6).

Said components (8, 9, 13, 13') of the suction device (5) are preferably arranged outside of the drying chamber (22). They are connected by one or more lines (12) to the preferably individual suction element (7) or preferably to a plurality of respective suction elements (7) through one or more lines (12). Directional control valves and shut-off valves, pressure gages, throttles and other elements for controlling the flowing medium may be arranged at the lines (12).

The suction device (5) may further have a return (16), which will be explained in more detail below, for the dehumidified gas stream (6') emitted by the vacuum generator (8) into the drying chamber (22). The suction device (5) may have, as an alternative or in addition, a gas release unit (11), especially an air release unit, for releasing the emitted gas stream (6') into the environment.

The suction device (5) may have different configurations according to FIGS. 1 through 8 and 13. It may also be associated with the drying device (2) in different manners.

A suction element (7) or a plurality of suction elements are arranged within the drying chamber (22) in the variants according to FIGS. 1, 2, 4 through 7 and 13. FIG. 8 shows a variant with an arrangement of one or more suction elements (7) outside of the drying chamber (14). In addition, it is possible in one variant, not shown, to arrange one or more respective suction elements (7) within and outside of the drying chamber (22).

FIG. 3 shows a variant, in which one or more suction elements (7) are located in the inlet (18) of the drying chamber (22). They may also be arranged partially within and outside of the drying chamber (22).

Two respective suction elements (7) are present in the exemplary embodiments shown. This is favorable for the efficiency of the suction and dehumidification and for the construction effort and the space requirement. The number of suction elements (7) may also be greater than two, e.g., three or four. The suction device may also have only an individual suction element (7).

The one or more suction elements (7) may be arranged in all variants at the conveying device (23), with which the material web (4) is moved and guided in the drying chamber (22). They are preferably located in the area of the inlet (18)

of the material web (4). As an alternative or in addition, one or more suction elements (70) may be arranged at another point of the drying device.

One or more suction elements (7) are positioned at an area of the conveying device (23) arranged within the drying chamber (22) in the embodiments shown in FIGS. 1, 2, 4 through 7 and 13. One or more external suction elements (7) are arranged at an external area (26) of the conveying device (23) in the variant according to FIG. 8. FIG. 3 shows an arrangement in the inlet (18).

The suction elements (7) according to FIGS. 1, 2, 4 through 7 and 13, which are arranged within the drying chamber (22), suction the hot gas or dry gas, which is located in the drying chamber (22) and which forms the suction flow (6) with the suctioned-in and entrained liquid particles from the material web (40).

Cooler ambient air is suctioned in in a variant according to FIG. 8 with the external arrangement of one or more suction elements (7), and this cooler air forms the suction flow (6) together with the suctioned-in and entrained liquid particles.

In the variant according to FIG. 3, e.g., two suction elements (7) are located, each with respective areas, in the inlet (18) and with their other areas within or outside of the drying chamber (22). Their respective nozzle opening is arranged within or outside of the drying chamber (22). The upper suction element (7) suctions hot gas or dry gas out of the drying chamber (22). The lower suction element (7) suctions in ambient air. In another embodiment variant, a suction element (7) may be arranged with its nozzle opening centrally in the inlet (18). It may suction hot gas or dry gas and also ambient air. The suction flow (6) generated in the process forms an effective flow barrier and sealing against the entry of air from the environment into the drying chamber (22) and against gas discharge from the drying chamber (22) into the environment.

In a variant of the embodiments shown, internal and external suction elements (7) with arrangement next to the inlet (18), which is sealed, e.g., in another manner, may also be present in a variant of the embodiments shown.

The heat contained in the suction flow (6) may be used to heat fresh gas for the drying device (2). In addition or as an alternative, the heat contained in the released, optionally dehumidified gas stream (6') may be fed again to the drying chamber (22). The dehumidified gas stream (6') may also be released to the environment by means of a gas release unit (11), especially an air release unit.

The suction flow (6) may have the temperature existing at the suction point (53). This may be the ambient temperature in case of the external arrangement of suction elements (7). In case of the internal arrangement of one or more suction elements in the drying chamber (22), this may be the temperature of the heated gas or of the drying gas. The temperature of the suction flow (6) may, in addition, be raised by the waste heat of the vacuum generator (8) on the blow-out side.

The conveying device (23) is configured as a fluid-permeable and flexurally elastic conveyor belt (24) in the embodiments according to FIGS. 1 through 12. This conveyor belt is led out in some areas at the inlet (18) and at the outlet (19) from the drying chamber (22).

The inlet (18) and the outlet (19) for the material web (4) and for the conveyor belt (24) are located at the lower area of the drying chamber (22), e.g., at the bottom of the drying chamber (22) or of the housing (17). The material web (4) and the conveyor belt (24) have an upright, especially vertical extension at the inlet (18) and at the outlet (19). The inlet (18) and the outlet (19) may be sealed in the manners mentioned.

The material web (4), which enters, e.g., externally horizontally, is deflected upwards by means of a deflecting roller and brought into contact with the moving conveyor belt (14) outside of the drying chamber (22) as well as entrained by this and transported through the inlet (18) and into the drying chamber (22).

In a variant of the embodiments shown, the conveyor belt (24) may also be arranged entirely within the drying chamber (22).

The conveyor belt (24) circulates in all exemplary embodiments in the direction of run (28) of the material web (4). The conveyor belt (24) guides and supports the material web (4) and entrains it by its circulating movement. The conveyor belt (24) is guided in a closed ring-shaped path and is driven in a circulating manner in the direction of run (28). The conveyor belt (24) may be guided via one or more deflections (25) and tensioned. The deflections (25) may be formed, e.g., by freely rotatable deflecting rollers. Suction, which holds the conveyor belt (24) and the material web at the deflection by suction pressure, may be located at one or more deflections (25).

A loop-shaped, especially U-shaped path of movement (27) is formed for the conveyor belt (24) and for the material web (4) within the drying chamber (22) by means of the deflections (25). Deflections (25), which are used to form straight path sections of the loop-shaped path of movement (27), are arranged here above the inlet and the outlet (18, 19). The path of movement (27) may have the individual loop shape shown, which bulges out upwards in relation to the inlet (18) and the outlet (19). A plurality of loops are possible as an alternative.

In the variant according to FIG. 13, the conveying device (23) has a fluid-permeable drum, which rotates in the direction of the arrow, and in the drum jacket of which, which is, e.g., perforated, the material web (4) is led in a circular loop (27). This may take place by a direct contact of the material web (4) with the drum jacket or due to the interposition of a likewise fluid-permeable conveyor belt. For example, the conveying device (23) is arranged entirely within the drying chamber (22) in FIG. 13. The drying chamber (22) may be configured, e.g., as a drying oven in the embodiment according to FIG. 13.

The ventilating device (29) generates a circulating flow (31) of the heated gas, especially air, within the drying chamber (22). The ventilating device (29) may have for this purpose one or more blowers (33) and one or more heating devices (30). The circulating flow (31) is directed transversely through the material web (4) and the conveying device (23). The circulating flow (31) ensures thermal drying of the material web (4). The circulating flow (31) holds, furthermore, the material web (4) in contact with the conveying device (23). A plurality of and preferably separated circulating flows (31) may be present within the drying chamber (22).

In the case of suction within the drying chamber (22), the suction flow (6) and the circulating flow (31) are present next to each other and are directed in the same direction. The circulating flow (31) may flow next to the respective suction point (53) and the suction flow (6). This embodiment is shown in FIGS. 2 and 3 and may be present in all variants according to FIGS. 1 through 13.

The suction flow (6) has a higher velocity of flow and a higher vacuum or pressure difference than the circulating flow (31). The suction flow (6) is bundled narrowly due to the corresponding shape of the suction element (7) and has a substantially smaller flow cross section and action area on the material web (4) than the adjacent circulating flow (31).

The suction capacity of the vacuum generator (8) for the particular suction flow (7) may be substantially higher than the suction capacity of the ventilating device (29) for the adjacent circulating flow (31). The particular vacuum generator (8) may generate, e.g., a pressure difference of about 0.5 bar, and a blower (33) of the ventilating device (29) generates a pressure difference of 0.02 bar.

The drying device (2) may have a gas atmosphere in the drying chamber (22), which is controlled or regulated in terms of its temperature and preferably also in terms of its moisture content. The drying device (22) may have an individual and uniform chamber area, in which the moving material web (4) and the conveying device (23) are received for being subjected to the processing with the dry gas. A uniform gas atmosphere may be present in this individual area of the chamber.

In the embodiment shown in FIGS. 1 through 12, the drying device (2) has a drying chamber (22), which is divided into a plurality of chamber areas (35-39). The chamber areas (35-39) may be partitioned against each other, but this is not absolutely necessary.

A respective separate gas atmosphere may be present in the chamber areas (35-39). This atmosphere may be controlled or regulated independently in terms of its temperature and humidity. Different gas atmospheres with different temperatures and different humidity levels of the gas or drying gas may be present in the different chamber areas (35-39).

Such a configuration of a drying chamber (22) with a plurality of chamber areas, which are optionally partitioned from one another, may also be present in a modified embodiment according to FIG. 13. The chamber areas (35-39) may be arranged stationarily in the different variants.

FIGS. 1 and 2 show an embodiment of the drying chamber (22) with two chamber areas (36', 38') arranged laterally next to one another and with a chamber area (39) arranged on top of them. The chamber areas (36', 38') arranged next to one another may be separated from one another by an upright, air-tight partition (40). They may have an upright, especially vertical orientation. The upper chamber area (39) connects the chamber areas (36', 38') arranged next to one another. It may have a lying, especially horizontal orientation. A lying and air-permeable or optionally air-tight partition (41) may be arranged between the chamber areas (36', 38') and the upper chamber areas (39). Said partition may also be absent.

The chamber areas (35-39) may be arranged in a matrix one on top of another and next to one another in the embodiment according to FIGS. 3 and 9 through 12.

The chamber areas may be present as sectors with a distribution, at least in some areas, over the circumference of the conveying device (23) in the variant according to FIG. 13 with the drum-shaped conveying device (23). The one or more suction elements (7) are arranged, e.g., within the drum-shaped conveying device (23) in the chamber areas. One or more suction elements (7) may also be arranged in a chamber area, which is, e.g., a lower chamber area and adjoins the inlet (18). The material web (4) may be supported and transported here by an additional conveying device, not shown, which is located within the drying chamber (22).

The material web (4) and the conveying device (23) pass through the one or more chamber areas of the drying chamber (22). In the chamber area or chamber areas (35-39), the gas, especially air or the circulating flow (31) flows to and through the material web (4) on one side in the process in the chamber area or chamber areas (35-39). The gas stream is directed here against the material web (4) and flows first through the material web (4) and then through the supporting conveying device (23). In case of a drying chamber (22) divided into a plurality of chamber areas (35-39), the material web (4) and the conveying device (23) pass optionally through the partitioned chamber areas (35-39) one after another. The heated gas or drying gas always flows to and through them from the same direction in the different chamber areas (35-39).

The plurality of chamber areas (35-38) are arranged in the chamber configuration shown in FIGS. 3 and 9 through 12 in a chamber matrix with a plurality of columns next to one another with a plurality of rows one on top of another. These may be, e.g., two upright columns and three or more horizontal rows. The drying chamber (22) may have on the top side a central, connecting chamber area (39) with a horizontal orientation.

The material web (4) and the conveying device (23), especially the conveyor belt (24), pass through the chamber areas (35-39) approximately in their central area in the variants shown in FIGS. 1, 2, 3 and 9 through 12. The material web (4) and the conveying device (23) pass with an upright, preferably vertical orientation through the lateral chamber areas (36', 38') and the chamber areas (35-38) arranged in the matrix. They have a lying, preferably horizontal orientation in the upper, lying chamber area (39). The deflections (25) are arranged correspondingly.

The chamber areas (35-39) are separated from one another in at least some areas by plate-like or wall-like partitions (40, 41). An upright, especially vertical and essentially gas-tight partition (40) is arranged between the columns of the chamber matrix and between the left chamber areas (35, 36) and the right chamber areas (37, 38). Partitions (41), which may be gas-tight, are arranged in a lying, especially horizontal orientation between the rows of the chamber matrix and the respective chamber areas (35, 36) and (37, 38), which are arranged one on top of another. The partitions (41) could have a bottom opening (42), e.g., at the locations of the passages of the material web (4) and the conveying device (3).

The variant according to FIGS. 1 and 2 differs from the variant according to FIGS. 3 and 9 through 12 with the chamber matrix by the absence of the lying partition (41) between the respective column-based chamber areas (35-38) and the merging of these chamber areas (35-38) to the left and right chamber areas (36', 38').

The ventilating device (29) generates a respective separate circulating flow (31) in the possibly partitioned chamber areas (35-39) in the variants according to FIGS. 1, 2, 3 and 9 through 12. A separate blower (33) and a separate heating device (30) may be present for this for each chamber area (35-39). A blower (33) may be present or absent as desired in the upper chamber area (39). The blowers (33) are arranged, for example, according to FIG. 12, preferably on the rear side of the housing (17) and at the rear wall located there. They are preferably configured as circulating blowers, which circulate the treatment gas present in the respective chamber area (35-39) and generate said lying or horizontal circulating flow (31). They suction in, e.g., axially and blow out radially. The deflections (25) may be connected to the suction side of the upper blowers.

The circulating flows (31) are oriented such that the vacuum side is arranged on the rear side of the conveying device (23), especially of the conveyor belt (24). In the chamber areas (35-38), the vacuum side is always at the sector of the respective chamber area, which sector is located towards the central partition (40). The material web (4) moving approximately centrally through the chamber areas (35-39) along with the conveyor (23) divides the respective chamber areas (35-39) into a sector with excess pressure on the incoming flow side of the material web (4) and into a sector with vacuum on the other side.

Figure 12:
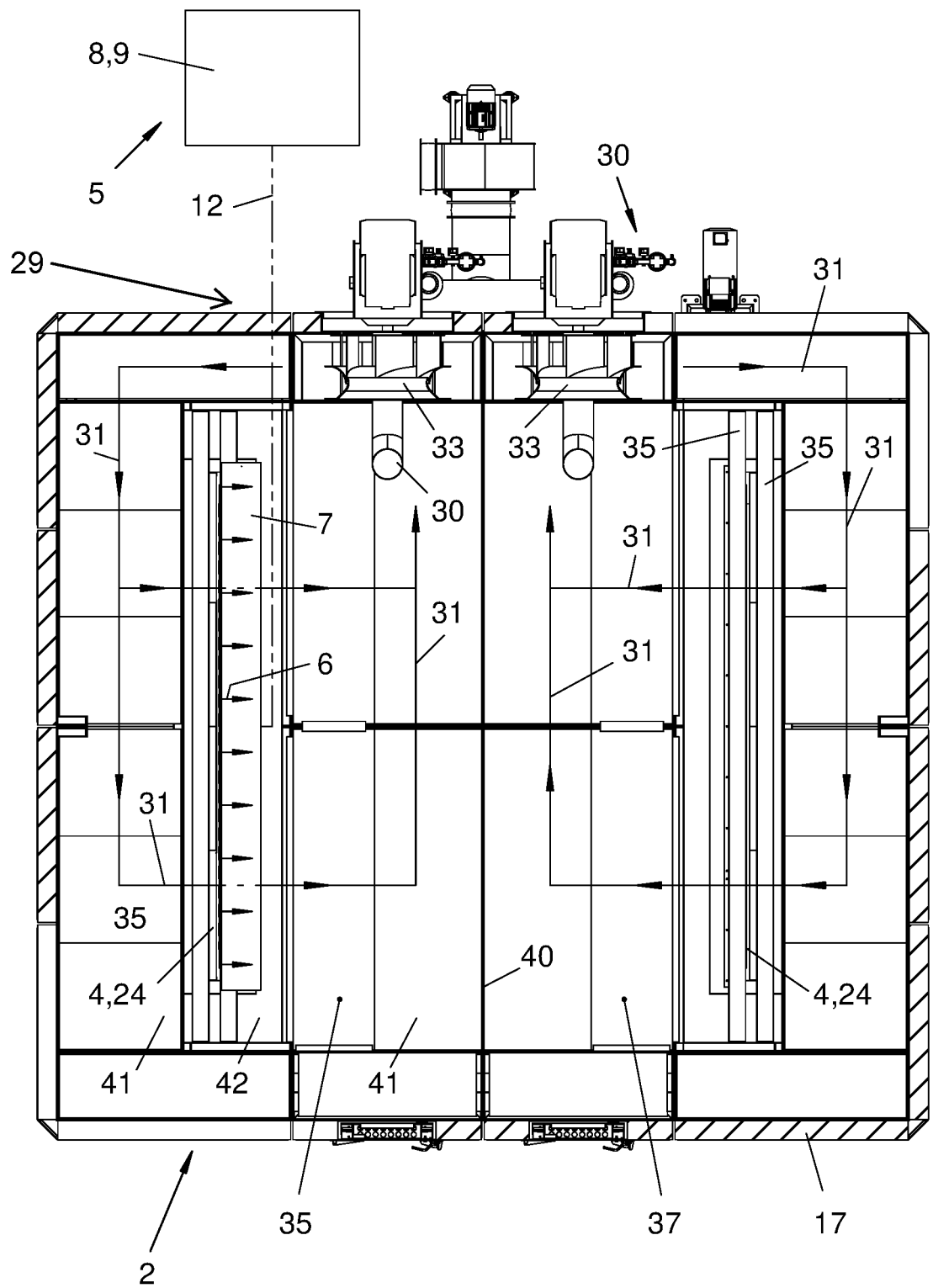
FIG. 12 is a cut-away view showing a drying device with a suction device.

The one or more suction elements (7) arranged in the vacuum sector suction the gas out of the excess pressure sector with the atmosphere present there. FIG. 12 shows this circulating flow (31) and its circulation through the sectors of the chamber areas in a cut-away top view.

A local pressure increase due to the blowing bars or the like located beyond the material web (4) is not provided in the exemplary embodiments shown. The mechanical dehumidification of the material web (4) takes place only by local suction with high suction pressure or vacuum on one side of the material web (4). Even though this is advantageous, it is not absolutely necessary. An additional local admission of pressure may be present in an alternative variant.

Figure 10:
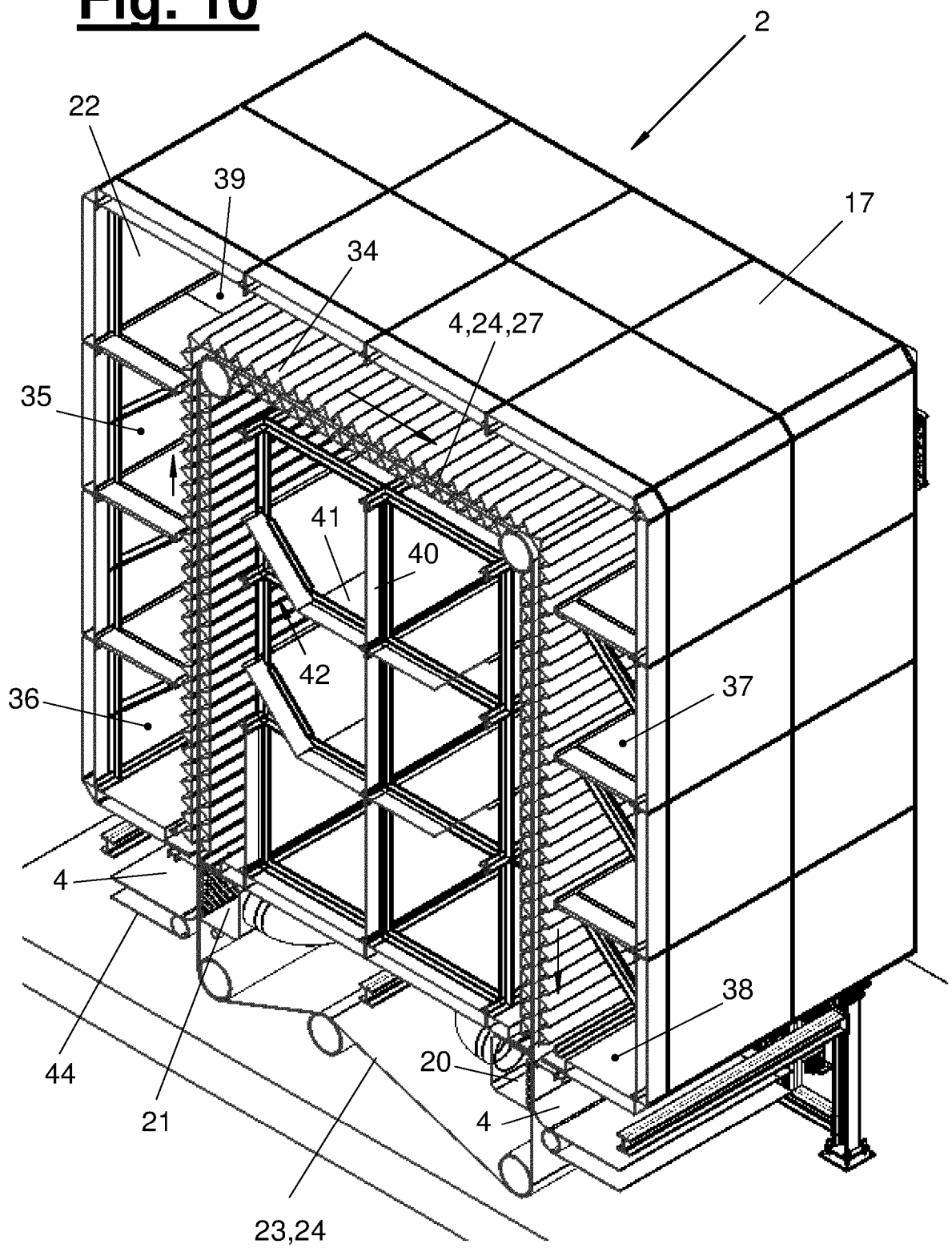
FIG. 10 is a cut-away view showing a drying device with a suction device.
Figure 11:
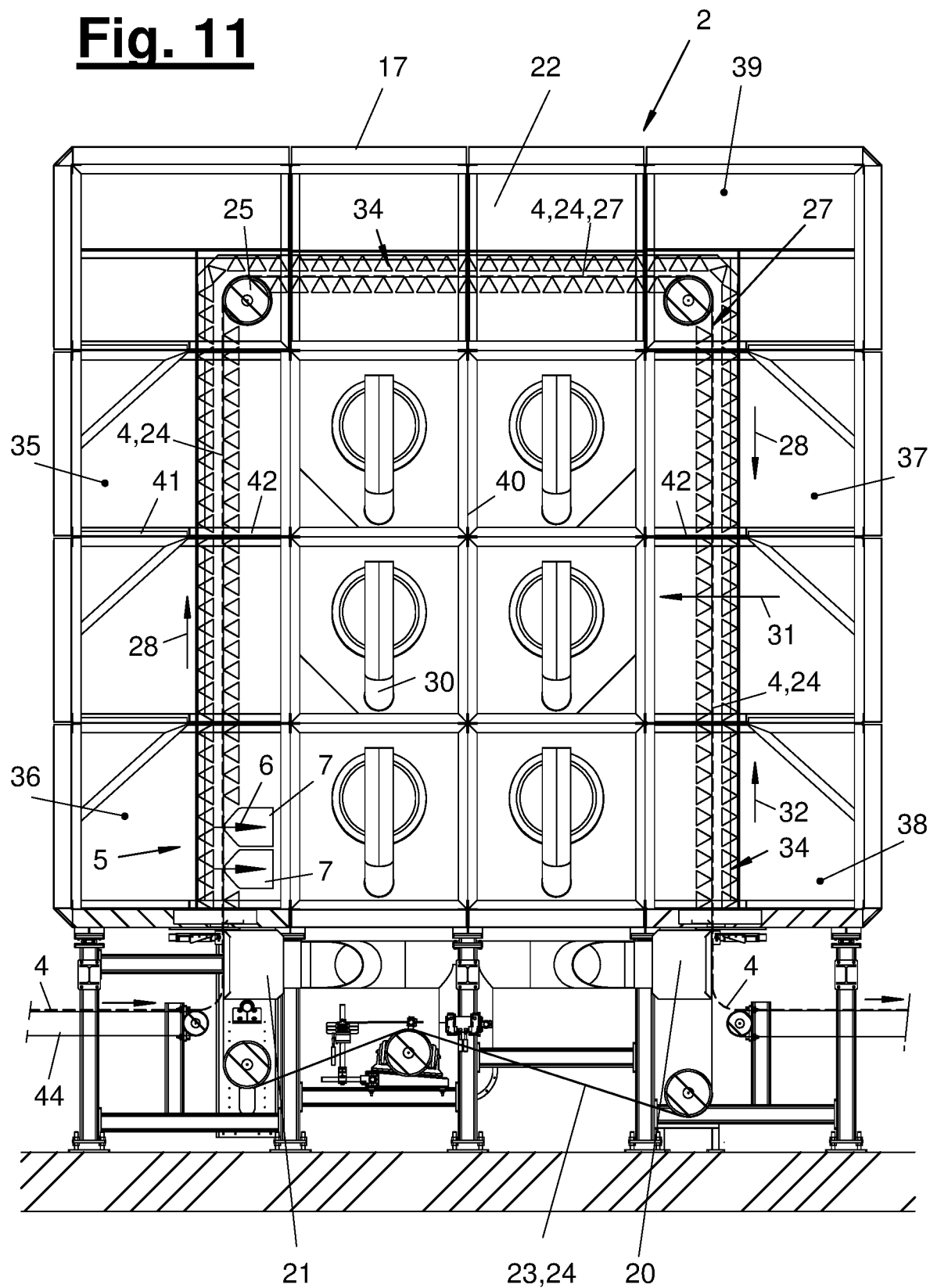
FIG. 11 is a cut-away view showing a drying device with a suction device.

The ventilating device (29) has a respective nozzle arrangement (34) each for the circulating flow (31) in a plurality of chamber areas (35-39) at the material web (2) according to FIGS. 10 through 12. The nozzle arrangement (34) may be absent or interrupted in the area of the suction point(s) (53). The nozzle arrangement (34) may also be present in the variant of the drying chamber (22) according to FIGS. 1 and 2.

The nozzle arrangement (34) may have a variable configuration. It comprises, e.g., a plurality of strip-shaped nozzle bodies, which have an essentially triangular cross section and are arranged at spaced locations next to one another or one on top of another and form a nozzle opening each between them. The nozzle arrangement (34) has, e.g., a respective row each of a plurality of outer nozzle bodies, e.g., in the chamber areas (35-39), in front of the material web in the flow direction and a row of a plurality of inner nozzle bodies behind the material web (4) in the flow direction. FIG. 11 shows this arrangement. Due to the triangular shape of the nozzle bodies the nozzle areas and flow areas formed between them are convergent and bundle the arriving gas stream towards the narrow, slot-like nozzle opening.

The nozzle bodies extend transversely to the direction of movement (28) of the material web (4) and in the direction of depth of the drying chamber (22). The nozzle bodies are held at their respective ends in a stand or frame. As a result, the width of the nozzle openings in the direction of movement as well as optionally the number of nozzle bodies lined up in a chamber area can be varied. The nozzle arrangement (34) extends in at least some areas, preferably circumferentially along the path of movement (27) and through bottom openings or passage openings (42) in the lying partitions (41) of the chamber areas (35-38) located in the chamber matrix as well as through upright partitions of the upper chamber area (39).

The ventilating device (29) also generates in the variants according to FIGS. 1, 2, 3 and 9 through 12 an exchange flow or counterflow (32) of the gas or drying gas, which is directed along the material web (4) and the path of movement (27) and also against the direction of movement (28) of the material web (4). The counterflow (32) is directed from the outlet (19) to the inlet (18). A gas feed unit (20) for fresh gas, especially fresh air, is arranged at the outlet (19). A gas removal unit (21) for the waste gas, especially waste air, is located at the inlet (18).

The fresh gas is fed with excess pressure by means of a blower into the drying chamber (22) at the gas feed unit (20) and the waste gas is removed with vacuum from the drying chamber (22) at the gas removal unit (21). The counterflow (32) is generated in the drying chamber by the separation in space and the distance as well as the pressure differences of the gas feed unit (20) and the gas removal unit (21).

The counterflow (32) has a moisture content increasing over the flow path from the outlet (19) to the inlet (18). The entering material web (4) has the maximum moisture content at the inlet (18). The gas likewise has a high moisture level here due to the counterflow (32). The gas streams, especially circulating flows (31) and the counterflow (32) as well as the material web (4) become increasingly drier in the direction of movement (28) of the material web (4). The material web (4) and the gas streams (31, 32) have the lowest moisture content at the outlet (19).

The fresh gas has the lowest moisture content and the waste gas the highest moisture content during the drying process. The gas feed unit (20) and the gas removal unit (21) are preferably located on the underside of the chamber. They may otherwise be arranged at any other desired point of the drying chamber (22).

The moving material web (4) is fed to the drying device (2) from the upstream liquid jet hydroentanglement device (3) via a conveying device (44), e.g., an endlessly running conveyor belt, and is transferred to the conveying device (23), especially the conveyor belt (24). The transfer takes place in the embodiment shown in FIGS. 1 through 12 in the external area (26) to the upright line of the conveyor belt (24) and just barely under the inlet (18). The material web (4) fed in the lying position is deflected in the process upward into an upright position.

In the variant according to FIG. 13, the material web (4) can be transferred from the conveying device (44) to another conveying device arranged within the drying chamber (22) and it can be conveyed by this farther to the drum-shaped conveying device (23). The release may also take place directly to the drum-shaped conveying device (23). The release of the dried material web (4) may take place from the conveying device (23) to another conveyor belt or the like in both embodiment variants.

The liquid jet hydroentanglement device (3) has one or more injectors (45), which emit each a plurality of narrowly bundled liquid jets (46) under high pressure against the moving material web (4), which is supported in the process by a conveying device (47), e.g., a rotating conveying drum. The conveying device (47) is fluid-permeable and is connected to a suction device (48), which removes the liquid introduced and the ambient air entrained during the needling of the material web (4) from the conveying device (47) and removes it via a line (49).

The material web (4) fed by a pile-forming device (32) and optionally by an inserted nonwoven-layering apparatus or the like is fed on the inlet side of the liquid jet hydroentanglement device (3) via a conveying device (43), e.g., an endlessly running conveyor belt, and is transferred from here to the first conveying drum (47) or to another conveying device. A bottom-side injector may support here the transfer. The moving material web (4) is then transported further by the conveying devices (47), especially conveyor drums, and is released to the discharge belt (44). The fluid-permeable conveying devices (47) may also be configured in another manner, e.g., as conveyor belts.

The liquid removed from the liquid jet hydroentanglement device (3) by means of lines (49) along with entrained air may be fed to a processing unit. FIGS. 1 through 8 and FIG. 13 show different variants for this.

One or more, especially two, suction elements (7) are arranged in the first inlet-side chamber area (36') in the embodiment according to FIGS. 1 and 2. As an alternative or in addition, one or more suction elements (7) may also be arranged at another location in the drying chamber (22). The one or more lines (12) are led out of the drying chamber (22) and are connected each to a separate separator (9) and to an associated vacuum generator (8). The lines (12) are also connected here to the lines (49) of the water jet hydroentanglement device (3).

The outlets of the separators (9) for the separated liquid are connected to a fluid release unit (10), wherein a pump is possibly inserted. The outlets of the separators (9) for the dehumidified suction flow (6) are connected to a respective vacuum generator (8). The dehumidified gas flow blown out by the vacuum generators (8) is fed to a heat exchanger (33), with which the fresh gas for the drying chamber (22) can be preheated. The dehumidified gas flow cooled thereby is then removed into the environment via the gas release unit (11).

The ventilating device (29) of the drying device (2) may have a regenerating device (50) shown in FIG. 1. The hot and especially humid waste gas removed at the gas removal unit (21) can be sent over a heat exchanger (14) and then released as cool waste air (15). The fresh gas fed via the gas feed unit (20) can be heated with the heat released in the heat exchanger (14). This may be in addition to the heating in the heat exchanger (13, 13').

Figure 4:
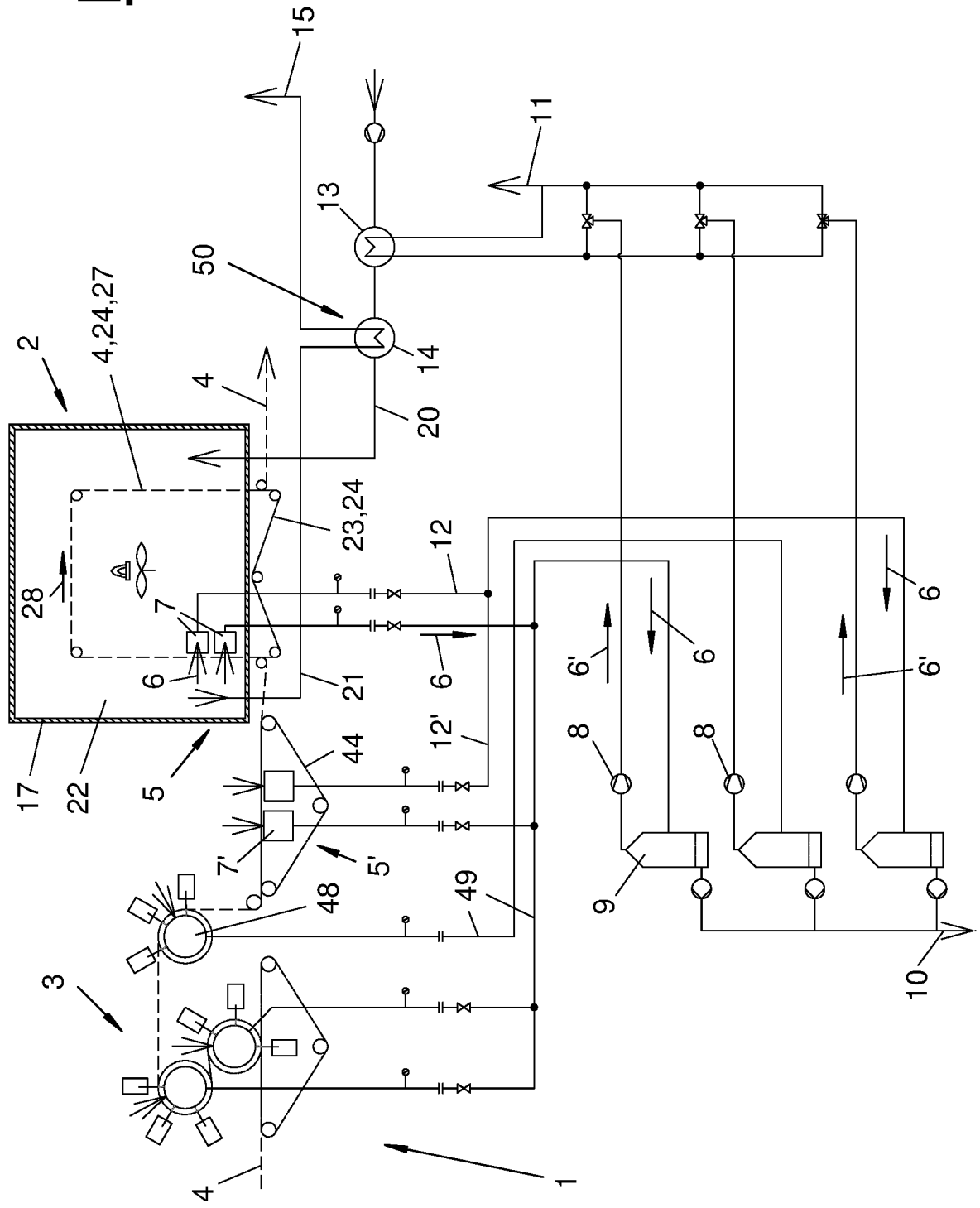
FIG. 4 is a schematic view showing a variant of the fiber treatment plant, of the drying device and of the suction device according to FIG. 1.

The variant according to FIG. 4 is largely identical to the embodiment according to FIG. 1. Another suction device (5') is arranged additionally at the discharge belt (44) in FIG. 4; this discharge belt (44) has one or more suction elements (7'), which are arranged at a fluid-permeable belt of the conveying device (44), which are connected via lines (12') to the, for example, three vacuum generators (8) and to three separators (9) of the suction device (5). The suction elements (7') suction ambient air through the moving material web (4) and the fluid-permeable conveyor belt.

FIG. 4 shows that the respective one or more vacuum generators (8) and separators (9) can be used jointly by the suction device (5), by the liquid jet hydroentanglement device (3) and optionally by the additional suction device (5') and are connected to these.

The suction device (5) may be present as original equipment in a drying device (2) and optionally in a fiber treatment plant (1). The preferably several vacuum generators (8) and separators (9) may be configured from the start as a common unit with connection to the liquid jet hydroentanglement device (3) and optionally to another suction device (5').

The suction device (5) may also be used to retrofit an existing drying device (2). The lines (12) may be connected in this case to a possibly already existing processing device of the liquid jet hydroentanglement device (3) or to another component of the plant and to ventilating devices (8) and separators (9) thereof. This also applies correspondingly to an optional, additionally arranged additional suction device (5').

Figure 5:
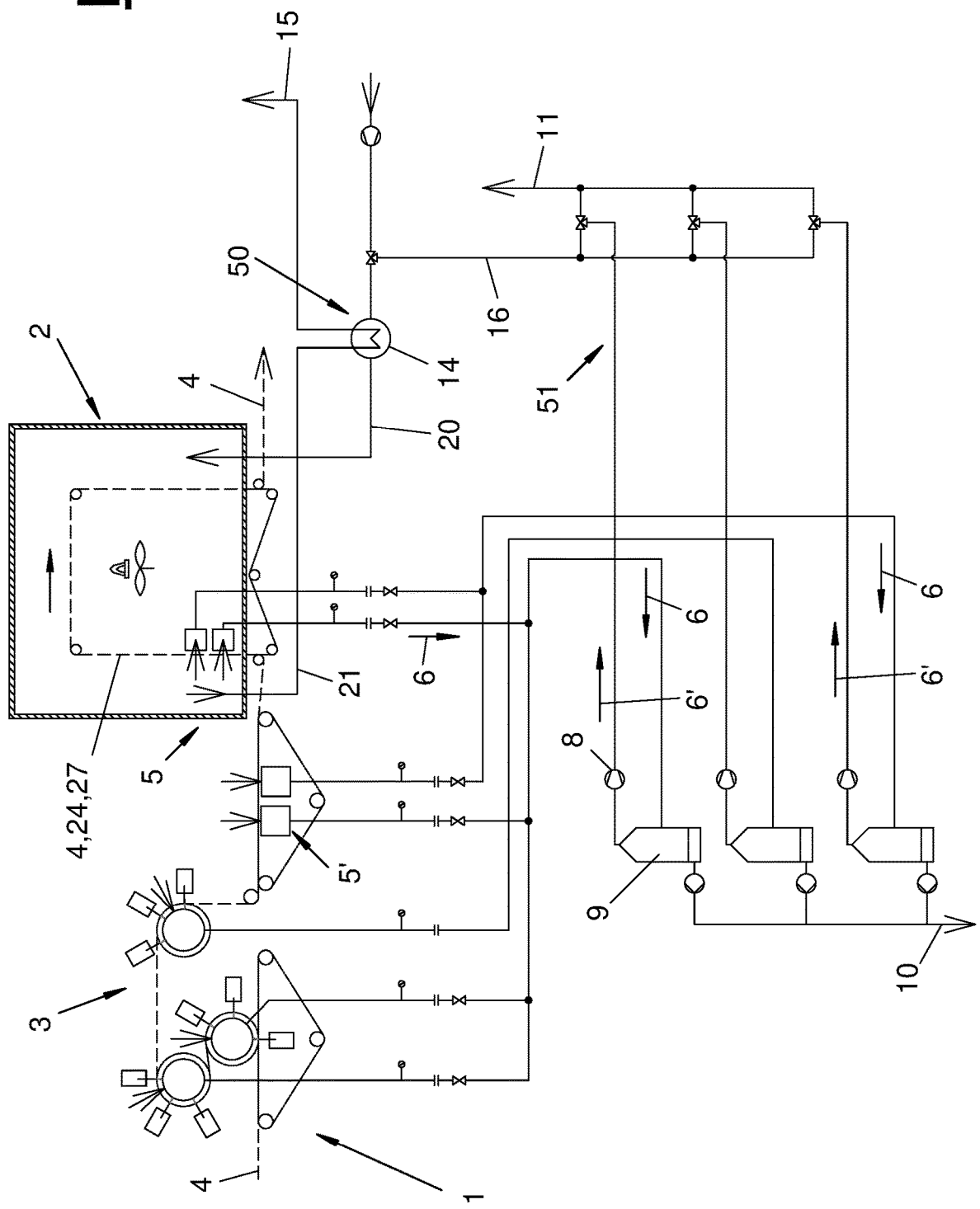
FIG. 5 is a schematic view showing a variant of the fiber treatment plant, of the drying device and of the suction device according to FIG. 1.

The variant shown in FIG. 5 differs from FIG. 4 by the absence of the heat exchanger (13). The gas stream blown out and dehumidified by the vacuum generators (8) may be fed optionally to a gas release unit (11) or into a feed line of the gas feed unit (20). A return (16) of the dehumidified gas stream into the drying chamber (22) together with the fresh gas is formed in case of this feed.

Figure 6:
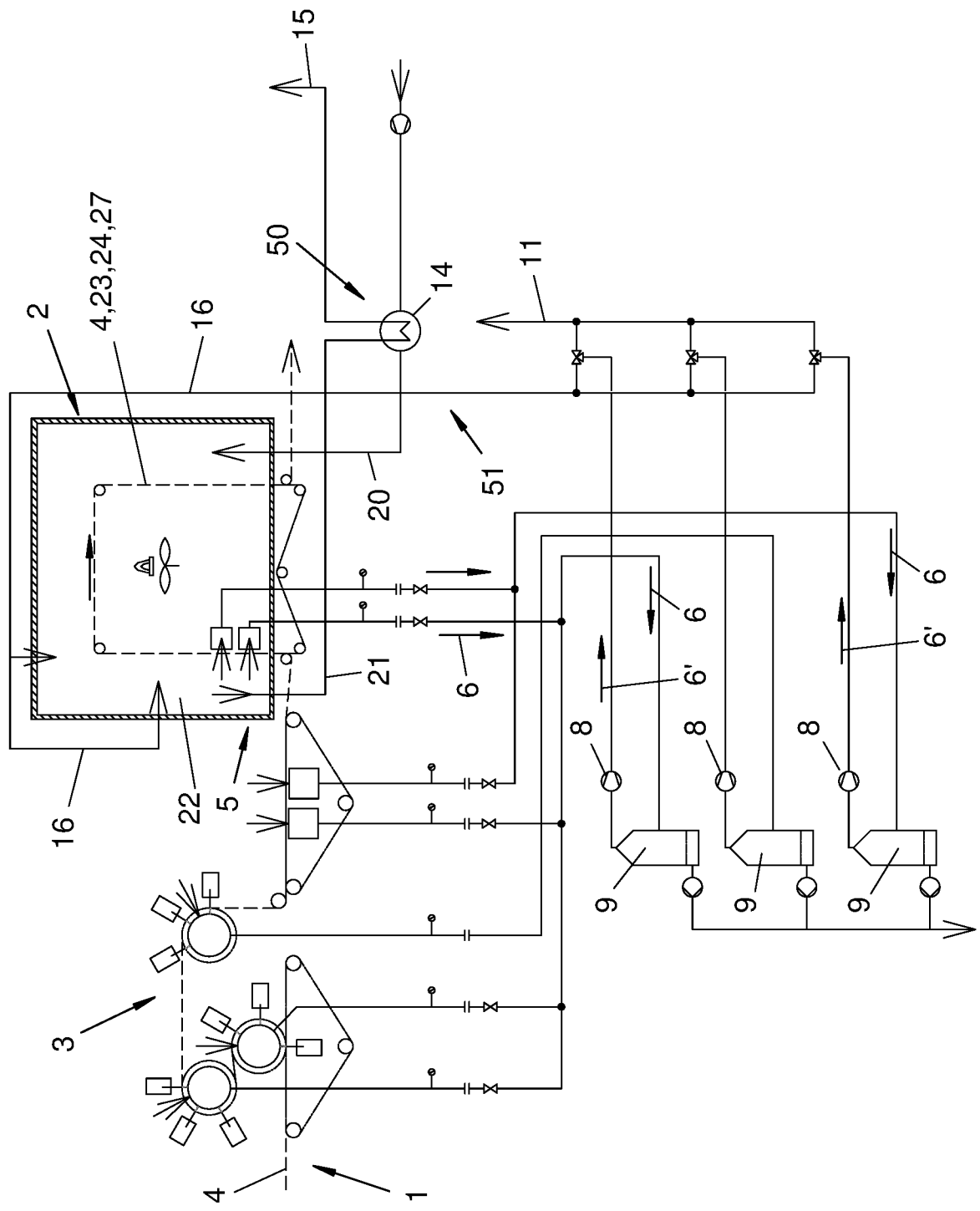
FIG. 6 is a schematic view showing a variant of the fiber treatment plant, of the drying device and of the suction device according to FIG. 1.

The variant shown in FIG. 6 differs from the embodiment according to FIGS. 1 through 5 by a different return (16) of the dehumidified gas stream (6') released by the vacuum generators (8). The return (16) is connected directly to the drying chamber (22). The dehumidified gas, which is possibly heated with waste heat of the vacuum generators (8), can be fed specifically into the drying chamber (22) at one or more points. In case the chamber is divided into a plurality of chamber areas, which are optionally partitioned against one another, feeding into a plurality of different chamber areas may be carried out.

The gas is moved in a circuit (51) through the suction device (5) and the return (16) with the one or more suction elements (7) arranged in the drying chamber (22). The hot and humid suction flow (6) is removed here, is dehumidified in the one or more separators (9) and then fed again as released gas stream (6') via the return (16) into the drying chamber (22) directly or indirectly via the fresh gas. The heat losses are low in this circuit (51). The return (16) shown in FIGS. 5 and 6 and the circuit (51) may also be used in the other embodiment variants described above.

Figure 7:
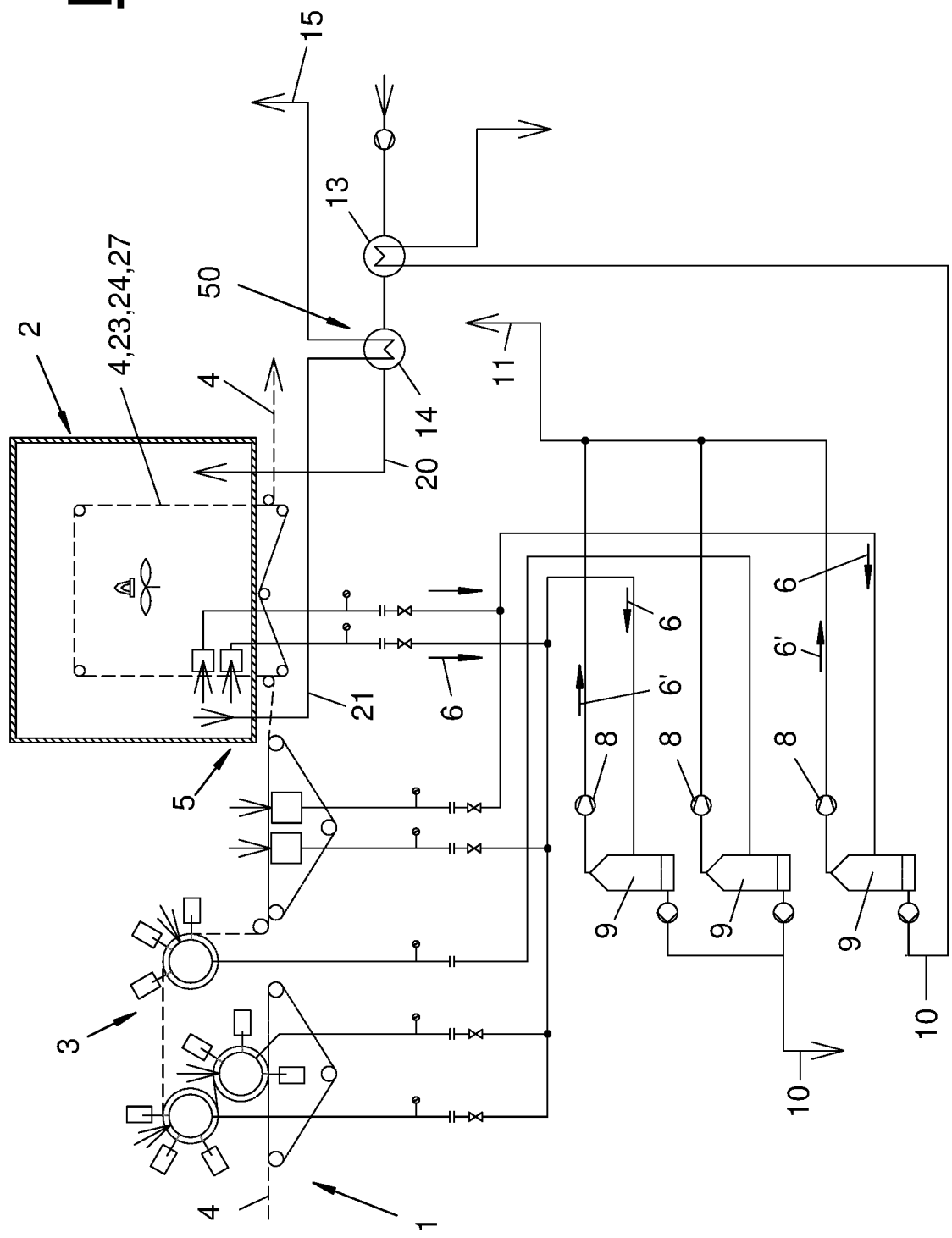
FIG. 7 is a schematic view showing a variant of the fiber treatment plant, of the drying device and of the suction device according to FIG. 1.
Figure 8:
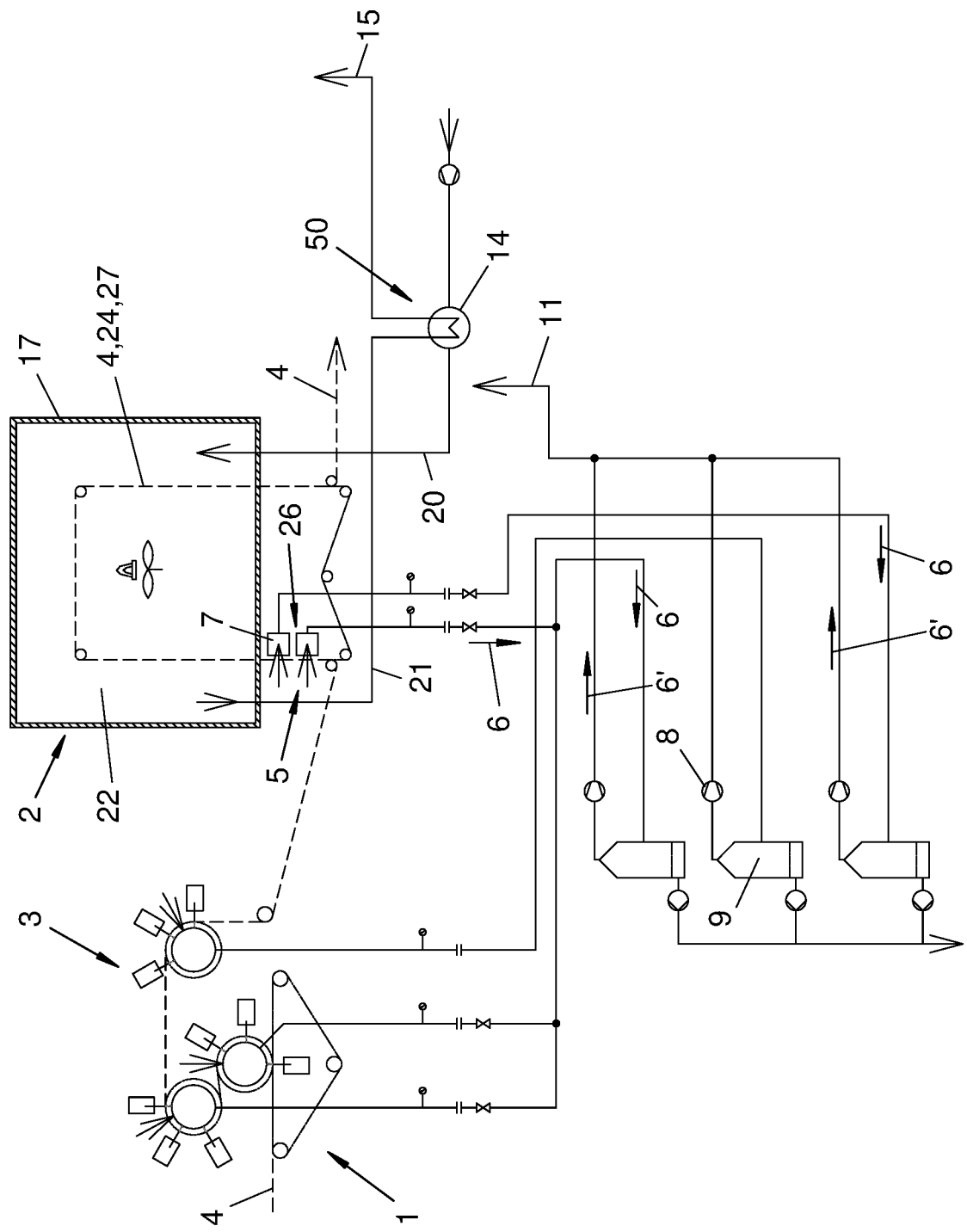
FIG. 8 is a schematic view showing a variant of the fiber treatment plant, of the drying device and of the suction device according to FIG. 1.
Figure 9:
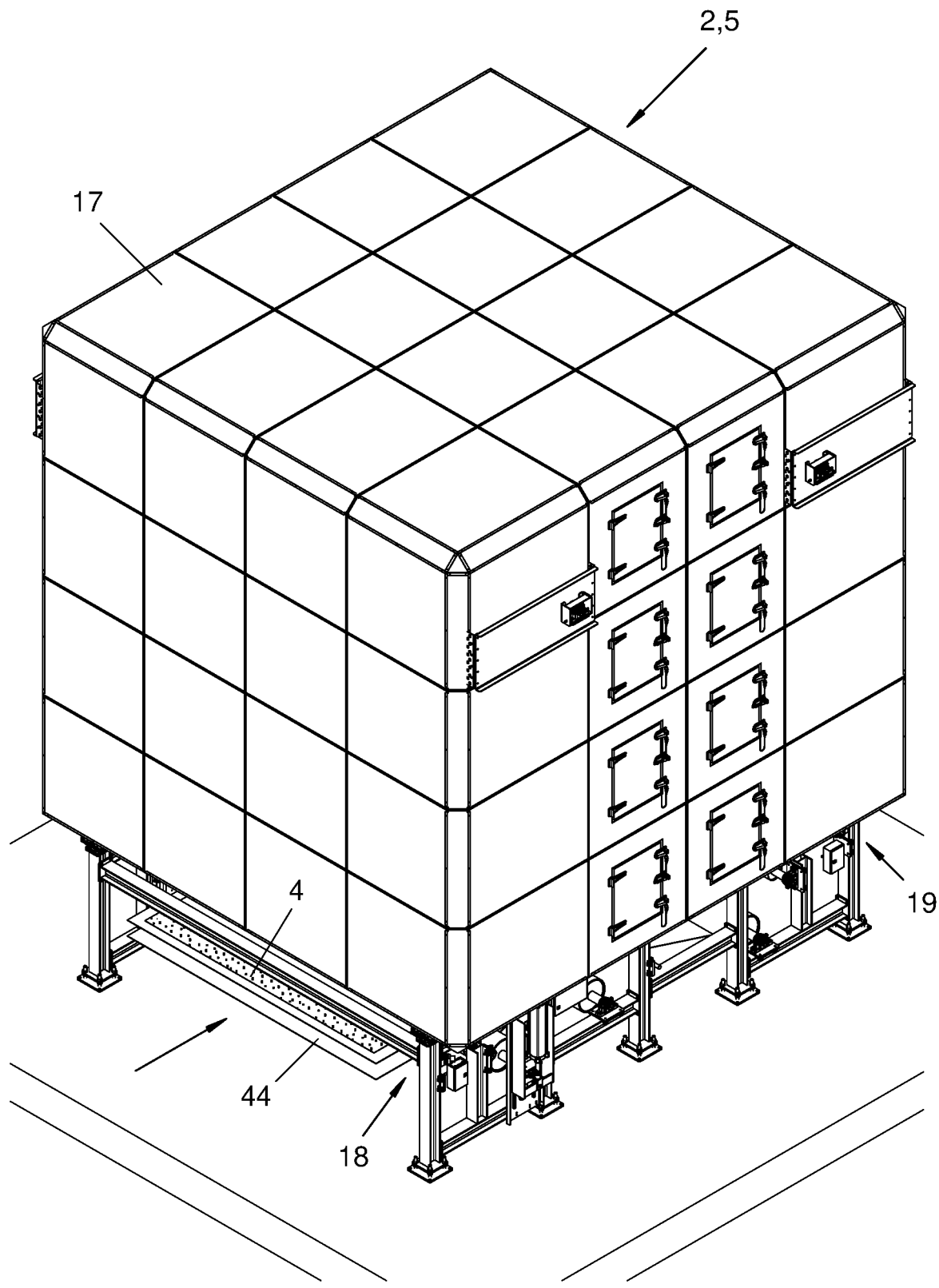
FIG. 9 is a perspective view showing a drying device with a suction device.

In the embodiment according to FIG. 7, the gas stream (6'), which is released, e.g., blown off, by the vacuum generators (8) and is dehumidified, is removed into the environment via the gas release unit (11). A fluid release unit (10) connected to at least one separator (9) is connected to the heat exchanger (13) in this variant. The residual heat in the liquid separated from the suction flow (6) can be used to heat the fresh gas for the drying device (2). The other fluid outlets of the one or more additional separators (9) may be connected via a fluid release unit (10) to the wastewater supply or to a circuit for returning the liquid to another consumer, especially to another component of the fiber treatment plant (1). This may be, e.g., the liquid jet hydroentanglement device (3).

FIG. 8 shows an embodiment in which the one or more suction elements (7) of the suction device (5) are arranged outside of the drying chamber (22). They are located at said external area (26) of the conveying device (23). FIG. 8 also shows an especially simple variant of the gas routing, in which the one or more separators (9) and the vacuum generators (8) are connected to the gas release unit (11) for removal of the dehumidified gas into the environment.

The variant with the arrangement of one or more suction elements (7) in the inlet (18), which variant is shown in FIG. 3, may be combined with one of the circuit diagram variants according to FIGS. 1 and 4 through 8.

FIG. 13 shows said other embodiment of a drying device (2) and of a suction device (5) in connection with a line routing and arrangement of vacuum generators (8) and separators (9) according to FIG. 1.

Different variants of the embodiments shown and described are possible in different manners. In particular, the features of the above-described exemplary embodiments and of the variants mentioned may be combined and possibly also be replaced with one another. In particular, the line and gas routing in the variants according to FIGS. 1 through 8 and 13 may be combined and replaced with one another.

While specific embodiments of the invention have been shown and described in detail to illustrate the application of the principles of the invention, it will be understood that the invention may be embodied otherwise without departing from such principles.

LIST OF REFERENCE NUMBERS

1 Fiber treatment plant
2 Drying device

3 Liquid jet hydroentanglement device, spunlace
4 Material web, fibrous web
5 Suction device
5' Additional suction device
6 Suction flow
6' Released gas stream
7 Suction element, suction nozzle bar
7' Suction element
8 Vacuum generator, suction source, gas pump
9 Separator, cyclone
10 Fluid release unit, water release unit
11 Gas release unit, air release unit
12 Line
12' Line
13 Heat exchanger
13' Heat exchanger
14 Heat exchanger
15 Waste air
16 Return, suction flow
17 Housing
18 Inlet
19 Outlet
20 Gas feed unit, fresh air
21 Gas feed unit, waste air
22 Drying chamber
23 Conveying device for material web
24 Conveyor belt
25 Deflection
26 External area of the conveying device
27 Path of movement, loop
28 Direction of movement of the material web
29 Ventilating device
30 Heating device
31 Circulating flow
32 Exchange flow, counterflow
33 Blower
34 Nozzle arrangement
35 Chamber area, lateral, left, top
36 Chamber area, lateral, left, bottom
36' Chamber area, upright, left
37 Chamber area, lateral, right, top
38 Chamber area, lateral, right, bottom
38' Chamber area, upright, right
39 Chamber area, central, lying
40 Partition, chamber wall, central
41 Partition, chamber bottom
42 Bottom opening
43 Conveying device, feed belt
44 Conveying device, discharge belt
45 Injector
46 Liquid jet
47 Conveying device, conveyor drum
48 Suction device
49 Line
50 Regenerating device
51 Circuit
52 Pile-forming device, card
53 Suction point, admission point

The invention claimed is:

1. A drying device for a wet material web, hydroentangled with liquid jets, which said material web is comprised of a textile fibrous nonwoven, the drying device comprising:
a drying chamber with a ventilating device as well as an inlet, an outlet and a fluid-permeable conveying device for moving the material web, wherein the material web is transported within the drying chamber with the conveying device and is dried with a flow of a heated gas generated by the ventilating device; and
a suction device configured to generate an additional flow comprising a suction flow and to suction off locally and remove liquid contained in the material web at one or more suction point(s) at the material web, wherein the ventilating device generates a circulating flow of a heated gas, which is directed transversely through the material web and through the conveying device, wherein the suction device comprises a suction element and a vacuum generator connected to the suction element for generating the suction flow, the suction element being arranged at the at least one of the one or more suction points at the material web and at the conveying device, wherein the suction device suctions the heated gas, from the drying chamber at the respective suction point through the material web, wherein the suction flow and at least a portion of the circulating flow of the heated gas are present next to one another at the respective suction point at the material web and are directed in the same direction.

2. A drying device in accordance with claim 1, wherein the suction device has a separator connected to the suction element for separating the suctioned-off liquid from the suction flow, the drying chamber being defined by a drying device housing, the drying device housing having an inner housing surface, the inner housing surface and one side of the material web defining at least a portion of a circulation flow path of the heated gas, wherein the portion of the circulating flow passes from the one side of the material web to another side of the material web.

3. A drying device in accordance with claim 1, wherein the vacuum generator is arranged after a separator in the flow direction of the suction flow.

4. A drying device in accordance with claim 1, wherein:
the suction device has a heat exchanger for the suction flow; and/or the suction device has a heat exchanger for a dehumidified gas stream, which is released from the vacuum generator and is heated with waste heat of the vacuum generator; and
the respective heat exchanger is intended and configured for preheating a fresh gas, which is fed to the drying device and to the ventilating device thereof.

5. A drying device in accordance with claim 1, wherein the suction device has a return for a dehumidified gas stream, which is released from the vacuum generator and is heated with waste heat of the vacuum generator, into the drying chamber, the suction element being arranged adjacent to the inlet.

6. A drying device in accordance with claim 1, wherein the suction device comprises:
another suction element arranged outside of the drying chamber at an external area of the conveying device, and/or
another suction element arranged within the drying chamber and/or
another suction element arranged partially within and partially outside of the drying chamber.

7. A drying device in accordance with claim 1, wherein the conveying device is configured as a fluid-permeable, flexurally elastic conveyor belt or as a fluid-permeable and rotating drum.

8. A drying device in accordance with claim 1,
wherein the drying chamber has a plurality of chamber areas, which are arranged stationarily, one on top of another and next to one another, and through which the material web and the conveying device pass, wherein the gas always flows to and through the material web in the chamber areas on one side, and wherein the moving material web is guided in the drying chamber in an upwards and downwards directed path of movement and the path of movement is configured as an individual upright loop.

9. A drying device in accordance with claim 8, wherein the ventilating device generates a counterflow of the gas, which counterflow is directed against a direction of movement of the material web between the chamber areas.

10. A drying device in accordance with claim 1, further comprising a regenerating device for a waste gas, wherein the regenerating device and the suction device are coupled via a heat exchanger.

11. A drying device in accordance with claim 1, wherein the inlet and the outlet are arranged and formed at a lower area of the drying device for the entry and release of the material web with an upright extension, wherein the one or more suction points has a suction element arranged in an area of the inlet.

12. A drying device in accordance with claim 1, wherein the one or more suction points has a suction element configured as a hollow suction nozzle bar.

13. A drying device in accordance with claim 1, wherein the suction device is configured to generate an additional suction flow by suctioning in gas at the one or more suction points from an environment within the drying chamber from a rear side of the material web through the material web and through the conveying device.

14. A fiber treatment plant comprising:
a web-forming device for a moving material web configured as a fibrous web;
a laying device for the fibrous web;
a liquid jet hydroentanglement device; and
a drying device comprising:
a drying chamber with a ventilating device, an inlet, an outlet and a fluid-permeable conveying device for the moving material web, wherein the material web is transported within the drying chamber with the conveying device and is dried with a flow of a heated gas generated by the ventilating device; and
a suction device configured to generate an additional flow comprising a suction flow and to suction off locally and remove liquid contained in the material web at one or more suction point(s) at the material web, wherein the ventilating device generates a circulating flow of a heated gas, which is directed transversely through the material web and through the conveying device, wherein the suction device comprises a suction element and a vacuum generator connected to the suction element for generating the suction flow, the suction element being arranged at the at least one of the one or more suction points at the material web and at the conveying device, wherein the suction device suctions the heated gas, from the drying chamber at the respective suction point at the material web, wherein the suction flow and at least a portion of the circulating flow of the heated gas are present next to one another at the respective suction point at the material web and are directed in the same direction.

15. A fiber treatment plant in accordance with claim 14, wherein the suction element is configured as a hollow suction nozzle bar.

16. A fiber treatment plant in accordance with claim 14, wherein the suction device is configured to generate an additional suction flow by suctioning in gas at the one or more suction points at the material web from the environment within the drying chamber from a rear side of the material web through the material web and through the conveying device.

17. A process for treating a material web comprised of a textile fibrous nonwoven, the process comprising:
hydroentangling the material web with liquid jets;
drying the wet material web by means of a drying device comprising a drying chamber with a ventilating device as well as an inlet, an outlet and a fluid-permeable conveying device for moving the material web, the drying process comprising the steps of:
transporting the material web within the drying chamber with the conveying device and drying the material web with a flow of heated gas generated by the ventilating device, the ventilating device generating a circulating flow of a heated gas, which is directed transversely through the material web and through the conveying device;
generating an additional flow comprising a suction flow by a suction device, wherein liquid contained in the material web is suctioned off locally and removed with the suction flow at one or more suction point(s) at the material web, wherein the liquid is suctioned off at the one or more suction points at the material web by a suction element arranged at the conveying device, wherein the suction device suctions the heated gas, from the drying chamber at the respective suction point through the material web, wherein the suction flow and at least a portion of the circulating flow of the heated gas are present next to one another at the respective suction point at the material web and are directed in the same direction.

18. A process in accordance with claim 17, wherein the suction device suctions in gas at the one or more suction points from an environment outside of the dryer device from a rear side of the material web through the material web and through the conveying device.

19. A process in accordance with claim 17, wherein the heat contained in a gas stream and in a dehumidified gas stream released from a vacuum generator is used to heat fresh gas for the drying device and/or is fed again to the drying chamber with the released gas stream.

20. A process in accordance with claim 17, wherein the suction element is configured as a hollow suction nozzle bar.

* * * * *